Dec. 13, 1966  P. L. MAY ETAL  3,291,284
MECHANICAL DRIVE FOR BALE THROWER
Filed March 4, 1964  4 Sheets-Sheet 1
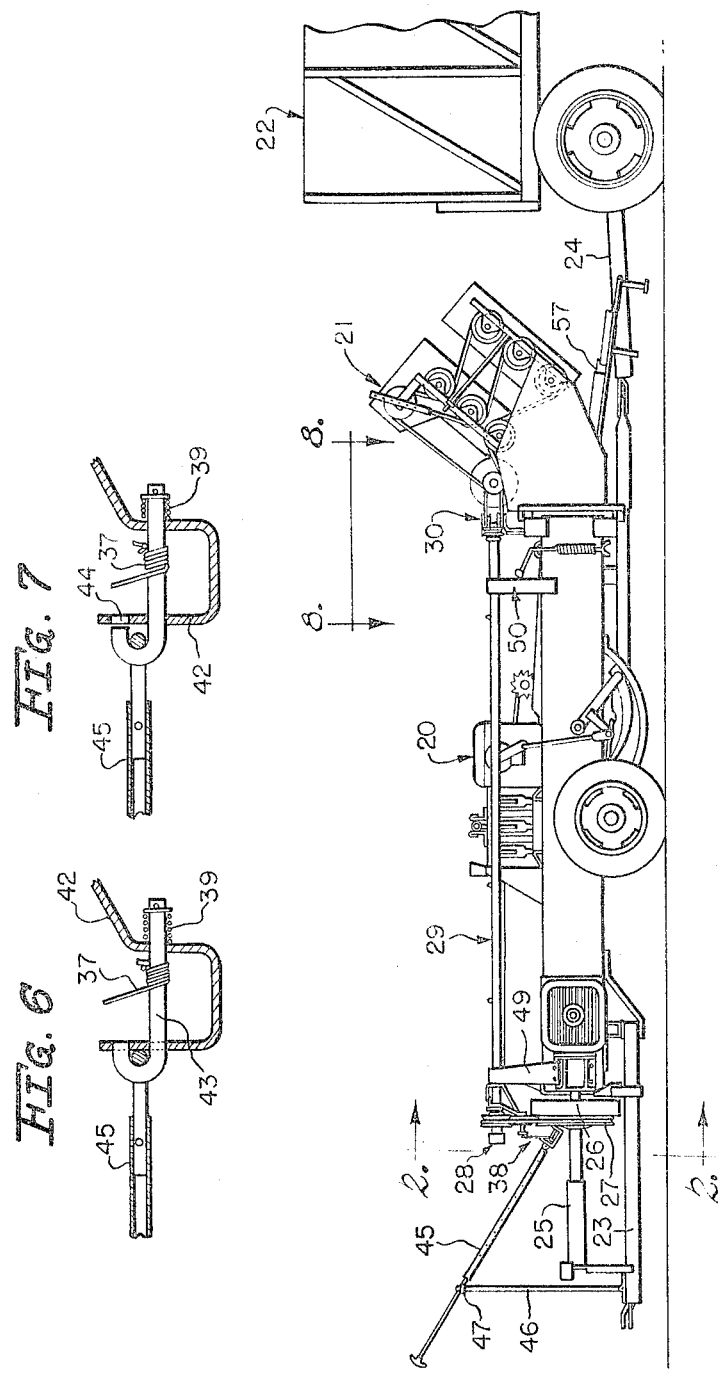
INVENTORS
Patrick L. May
Doyle A. Bumpious
Ralph Alvey
Atty.

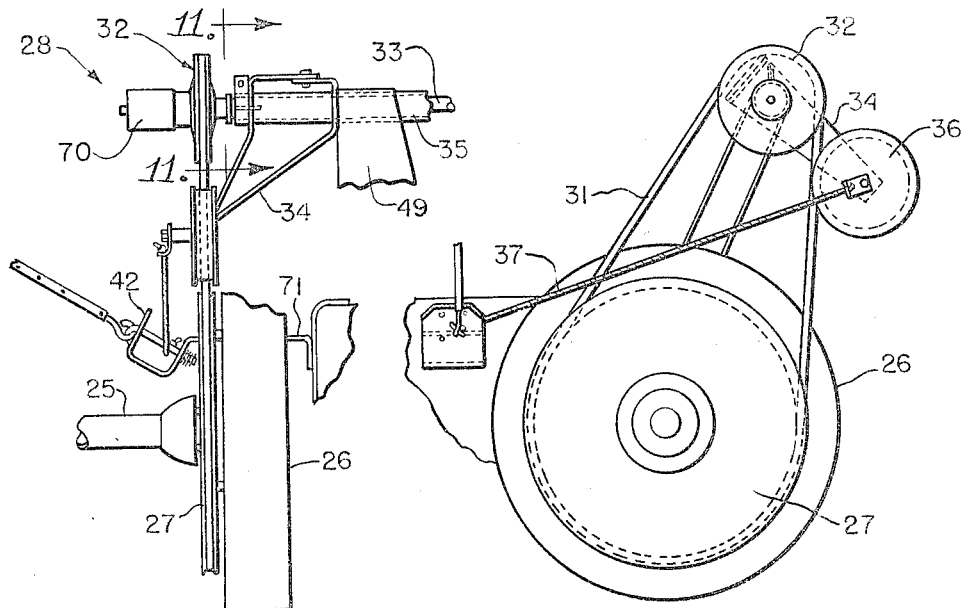
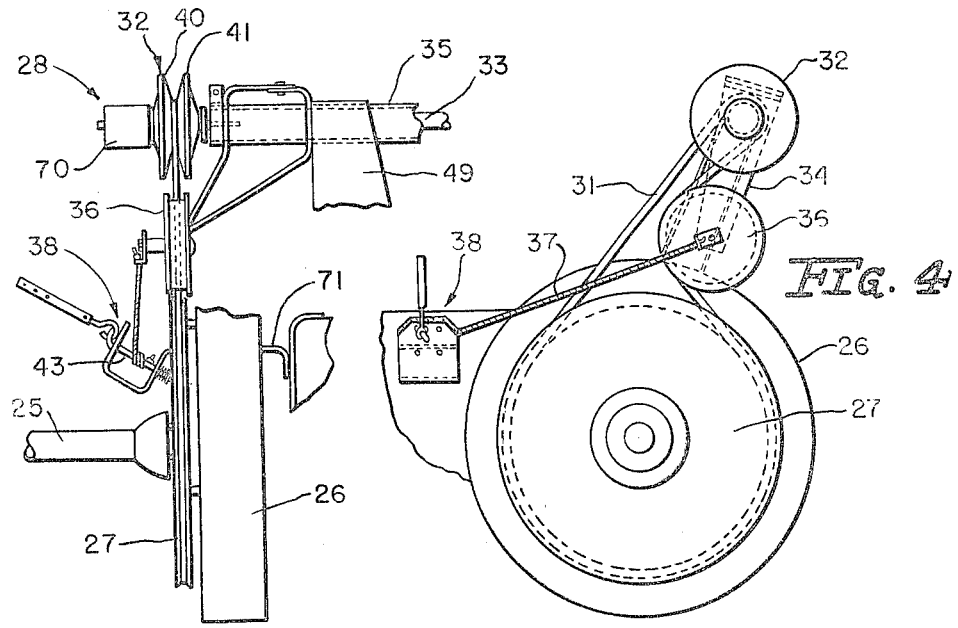

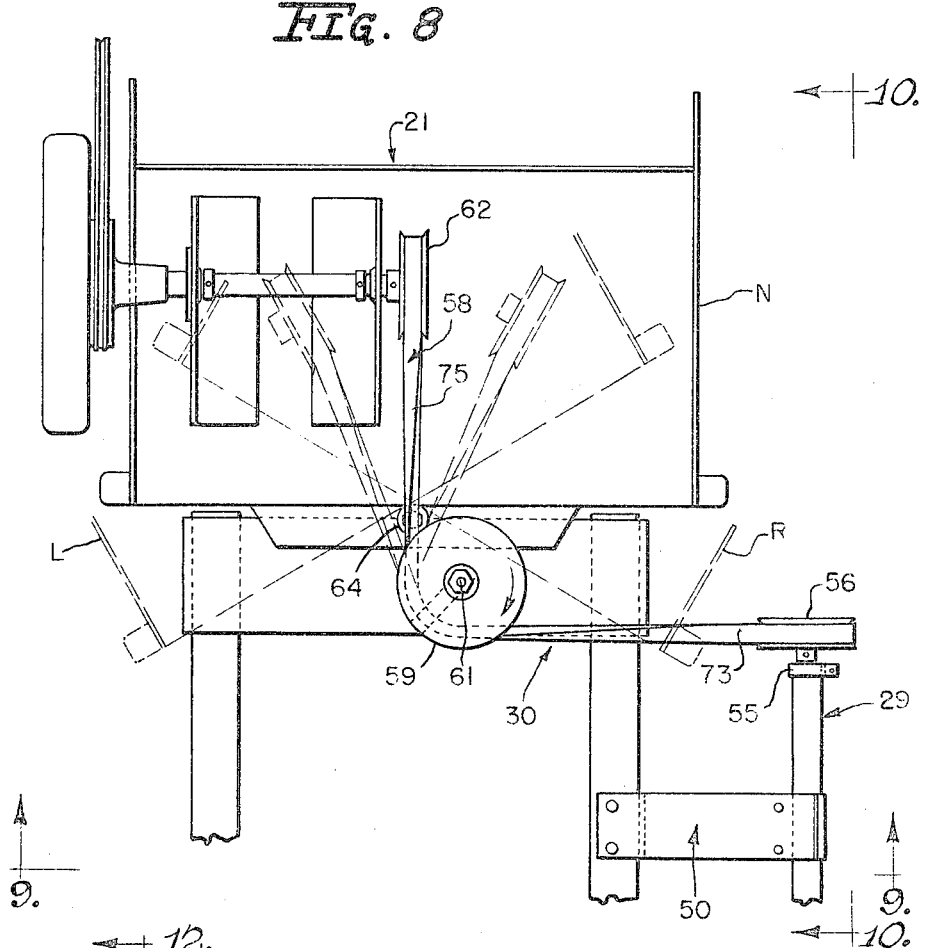
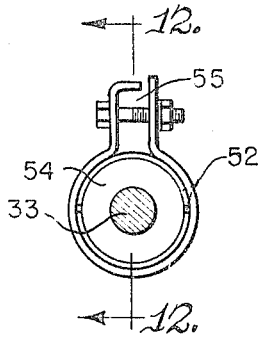
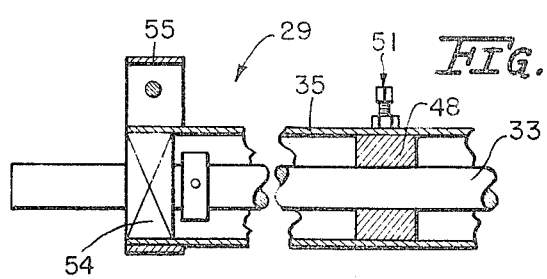

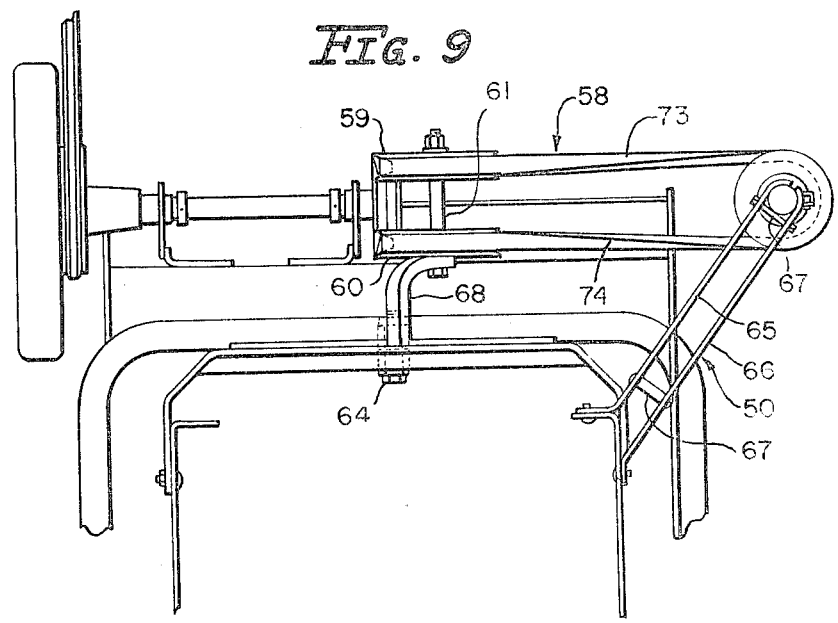
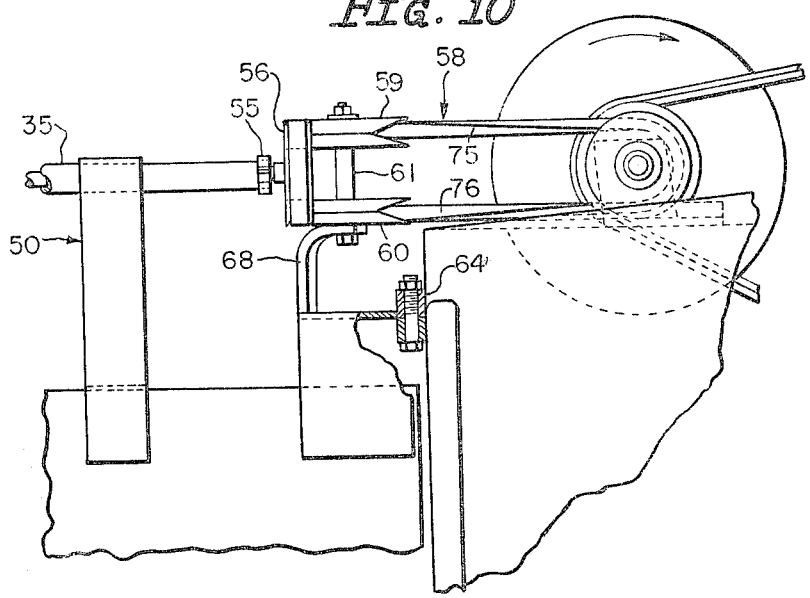

United States Patent Office 3,291,284
Patented Dec. 13, 1966

3,291,284
MECHANICAL DRIVE FOR BALE THROWER
Patrick L. May, Memphis, Tenn., and Doyle A. Bumpious, Huntsville, Ala., assignors to International Harvester Company, a corporation of Delaware
Filed Mar. 4, 1964, Ser. No. 349,234
5 Claims. (Cl. 198—128)

This invention pertains to a power supply for a bale thrower, that is, to a power take-off drive for transmitting power from a tractor engine to a bale thrower mounted on the rear of a hay baler.

While auxiliary engines are widely used to drive bale throwers, such engines have drawbacks e.g., they must be frequently refueled, their air intakes must be kept free of dust and hay particles, and so on. To avoid these problems a power take-off drive is now used to operate bale throwers. However, power takeoff drives also entail various other problems.

For example, since the tractor power takeoff shaft drives both the hay baler and the bale thrower, there is the problem of controlling the speed of the bale thrower independently of the speed of the hay baler. Also, with the tractor at the front end of the hay baler and the bale thrower at the rear end, there is the problem of transmitting power the entire length of the hay baler to the bale thrower. In addition, since the bale thrower is pivotally mounted on the hay baler, there is the problem of providing a flexible connection in the drive to the bale thrower.

The objects of this invention are, therefore, to provide a power take-off drive for a bale thrower embodying solutions to the above problems. Specifically, the objects are to provide:

First, a power take-off drive for a bale thrower wherein the speed of the bale thrower may be controlled independent of the speed of the hay baler;

First, a power take-off drive for a bale thrower, including novel line shafting structure for transmitting power the length of a hay baler;

Second, a novel bearing structure for the line shafting of the power take-off drive of a bale thrower; and Third, a flexible connection in the power take-off drive for a bale thrower, including novel means for maintaining the belting of the flexible connection taut regardless of the pivoting action of the bale thrower.

A bale thrower employing the power take-off drive of this invention is shown in the drawings, where:

FIG. 1 is a side elevation of a hay baler having a bale thrower mounted on the rear thereof, showing the general location of the novel power take-off drive;

FIG. 2 is a view taken on line 2—2 of FIG. 1, showing a front view of the speed control mechanism set at slow speed;

FIG. 3 is a side view of the mechanism of FIG. 2;

FIG. 4 is a view similar to that of FIG. 2, showing a front view of the speed control mechanism set at high speed;

FIG. 5 is a side view of the mechanism of FIG. 4;

FIG. 6 is a side view of the speed control mechanism windlass in locked position;

FIGURE 7 is a side view of the windlass in unlocked position;

FIG. 8 is a plan view of the mule drive, taken on line 8—8 of FIG. 1 showing in broken lines a bale thrower stationed in three different operational positions;

FIG. 9 is an end view of the mule drive, taken on line 9—9 of FIG. 8;

FIG. 10 is a side view of the mule drive, taken on line 10—10 of FIG. 8;

FIG. 11 is an end view of the lineshaft, taken on line 11—11 of FIG. 3; and

FIG. 12 is a cross section of the lineshaft structure, taken on line 12—12 of FIG. 11.

The main pieces of equipment used to bale hay are (FIG. 1) a hay baler 20, a bale thrower 21 pivotally mounted on the rear of the baler, and a wagon 22 for catching the bales of hay thrown by the bale thrower. A tractor (not shown) pulls the hay baler by means of hitch 23. The baler, in turn, pulls the wagon 22 by means of its tongue 24. Power for the hay baler and the bale thrower is obtained from the tractor engine by means of the main universal drive shaft 25 at the front of the baler. Power for bale thrower 21 is diverted to a power train (described below) from shaft 25 in any suitable manner, in the present case by pulley 27 on the face of flywheel 26 on shaft 25 (see U.S. Patent No. 2,685,804).

The power take-off drive for bale thrower 21 comprises a speed control mechanism 28 for regulating the power delivered by pulley 27 to the bale thrower, a lineshaft assembly 29 for transmitting power from the speed control mechanism 28, and a mule drive 30 for receiving power from the line shaft assembly 29 and delivering it to the bale thrower 21.

The speed control mechanism 28 (FIGS. 1–7) controls the distance that the bale thrower trajects a bale of hay, the length of the bale trajectory increasing with the speed of the bale thrower. The length of the bale trajectory is varied to distribute bales evenly throughout wagon 22. Speed control mechanism 28 is arranged as follows:

Pulley 27 on flywheel 26 (FIGS. 1–5) drives belt 31 which, in turn, drives the variable diameter pulley 32 on the forward end of lineshaft 33. Pulley 32 comprises two sections 40 and 41 yieldably biased together by the mechanism 70. The diameter of pulley 32 and, therefore, the speed of lineshaft 33 is varied by adjusting the pressure of belt 31 against pulley 32 through the use of idler pulley 36 located on the swinging arm 34 and bearing against belt 31.

Arm 34, pivotally mounted on lineshaft shield 35, swings in an arc about the axis of lineshaft 33. A cord 37 joins arm 34 to the windlass 38, the arcuate position of arm 34 and idler 36 being controlled by the length of cord 37 unwound from windlass 38.

The windlass mechanism 38 (FIGS. 1, 3, 5, 6 and 7) comprises a U-shaped standard 42 attached to a bracket 71 on the forward end of the hay baler. A J-shaped cord barrel 43 is journalled in the legs of the standard 42, a spring 39 secured to the end of the trunk of cord barrel 43 biasing the hook of the J towards the front face of the standard 42 and into one of a plurality of locking holes 44 formed therein.

The cord barrel 43 is rotated by a two-piece telescoping crank 45, secured to the hook of the cord barrel 43, and extending forwardly and upwardly from the cord barrel to the vicinity of the tractor cockpit. The length of crank 45 is adjusted by sliding the two telescoping sections relative to one another until the desired length is achieved. The crank is held at this desired length by a pin inserted through holes provided for that purpose along each length of the crank section. A pedestal 46 hinged to the baler hitch 23 has an adjustable bracket 47 attached thereto for supporting crank 45. When the bale thrower is not in use, the crank 45 may be dismounted and the crank 45 and pedestal 46 swung to the side of the hitch 23.

The operation of speed control mechanism 28 is as follows: Cord barrel 43 is unlocked (FIGS. 6–7) by pulling crank 45 forward against the bias of spring 39. To increase the speed of rotation of lineshaft 33 (FIGS. 4–5), the crank 45 is rotated to take up cord 37, thereby causing arm 34 to force idler pulley 36 against belt 31 with greater pressure. Sections 40 and 41 of the variable diameter pulley 32 move apart in response to this increased pressure of belt 31 and provide belt 31 with a smaller effective pulley diameter, thereby increasing the angular velocity of lineshaft 33 with respect to the linear velocity of belt 31.

To decrease the speed of rotation of lineshaft 33 (FIG. 2–3), the crank 45, when unlocked as above described, is rotated to pay out cord 37, thereby allowing arm 34 to swing outward so that idler pulley 36 exerts less pressure against belt 31. Sections 40 and 41 of the variable diameter pulley 32 move closer together in response to the reduced pressure of belt 31 and assume a larger effective pulley diameter, thereby reducing the angular velocity of lineshaft 33 with respect to the linear velocity of belt 31.

Lineshaft assembly 29, for transmitting power from the speed control mechanism 28 to mule drive 30, is constructed in the following manner:

Lineshaft shield 35, extending the length of baler 20 and enclosing lineshaft 33, is supported on the baler, at the front by the rigid support 49 and at the rear by flexible support 50 (described below). Lineshaft 33 is supported inside shield 35 by a plurality of bearings 48 (FIG. 12) intermediate the ends of shield 35, and by a ball bearing 54 at each end of the shield 35. Since the outside diameter of bearings 48 and ball bearings 54 mate with the bore of shield 35, the need for specially machined bearing supports is eliminated. Each bearing 48 is held in place by a set screw assembly 51. The ball bearings 54 are held in place by means of slits 52 located at diametrical points at each end of shield 35 and by means of the end clamps 55, which compress the split end portions of the shield against the ball bearings 54. With respect to lineshaft 33, adjustable pulley 32 at the forward end thereof is the driver, while rigid pulley 56 is the driven member.

The flexible belt mule drive assembly 30 (FIGS. 1 and 8), which receives power from lineshaft 33 and delivers it to the jackshaft pulley 62 of bale thrower 21, enables the bale thrower 21 to operate while swinging about the axis of pivot 64 at the rear of hay baler 20. As the baling equipment of FIG. 1 turns a corner, for example, wagon 22 assumes a position to the side of baler 20. To keep the bale thrower 21 aimed at wagon 22, so that the bales of hay will be thrown into the wagon and not outside of it, bale thrower hitch 57 (See FIG. 1) responds to movement of wagon tongue 24 by swinging the bale thrower 21 and holding it in line with wagon 22.

In mule drive 30, pulley 56 at the rear of lineshaft 33 drives belt 58, which extends from pulley 56 transversely of baler 20 to the idler pulleys 59 and 60, then rearwardly to jackshaft pulley 62 of bale thrower 21. Guide pulleys 59 and 60 are coaxially supported on the vertical stub shaft 61 mounted on the bracket 68 on the top of baler 20. So long as bale thrower 21 is aimed directly to the rear of the baler 20 (identified by position N and solid lines in FIG. 8), each of the belt runs 75 and 76 (FIG. 10) is taut. When the bale thrower 21 swings about the axis of pivot 64 to either position L or R (shown by broken lines in FIG. 8), the distance between the points of tangency of belt run 75 on pulleys 59 and 62 and the distance between the points of tangency of belt run 76 on pulleys 60 and 62 decreases and belt 58 tends to become slack. To counter the tendency of belt 58 to slacken and produce objectionable fluctuations in the speed of the bale thrower and the length of the bale trajectory, a compensating means for maintaining belt tension is provided.

This compensating means is the flexible rear support 50 (FIGS. 1, 8, 9, and 10) for lineshaft shield 35. Flexible support 50 comprises two leaf springs 65 and 66 projecting upwardly and to the side of baler 20 in cantilever form. The bottoms of springs 65 and 66 are attached to the baler; the tops are bent to the curvature of lineshaft shield 35 to form, with bolts 67 a clamp for gripping the shield. When bale thrower 21 is in the central position N, the support 50 is flexed inwardly, so that when the bale thrower swings to the side, e.g. to position L or R, the support 50 moves outward to absorb the slack in belt 58 and to keep it taut. In other words, when the bale thrower 21 is swung to the side positions where the belt would normally tend to slacken, the spring action of support 50 is such as to absorb the slack in belt 58 and to maintain belt 58 taut for all pivotal positions of the bale thrower.

In the foregoing description, a new and improved power take-off drive for a bale thrower is presented. The invention is not, however, limited to the exact device shown and described but embraces, as well, such equivalent forms that fall within the spirit and scope of the attached claims.

The invention claimed is:

1. For a bale thrower pivotally mounted on a baler at the bale discharge thereof, a power take-off drive comprising: a jack shaft on said bale thrower, a pulley attached to said jack shaft, a lineshaft, a pulley on one end of said lineshaft, resilient support means joining said lineshaft to said baled, a belt-type mule drive joining said lineshaft pulley and said jackshaft pulley, said resilient support means maintaining said belt taut as said bale thrower pivots, a variable diameter pulley on the other end of said lineshaft, a main power supply shaft for said baler, a pulley on said main power supply shaft, a endless power transmission belt engaging said variable diameter pulley and said main power supply shaft pulley, idler pulley means for said last-named belt pivotally mounted on said baler and engaging said last-named belt, and means joined to said idler pulley means for controlling the pressure with which said idler pulley engages said last-named belt.

2. For a bale thrower pivotally mounted on a baler at the bale discharge thereof, a power take-off drive comprising: a jack shaft on said bale thrower extending transversely to the longitudinal axis thereof, a pulley attached to said jack shaft, a lineshaft tube extending parallel to the axis of said baler, a bearing supported in said tube, at least part of the exterior surface of said bearing mating with the internal surface of said tube, a set screw assembly on said tube in alignment with said bearing, a set screw extending through said tube to secure said bearing in place, a lineshaft journalled in said bearing, a pulley on one end of said lineshaft adjacent said bale thrower, a belt-type mule drive joining said lineshaft pulley and said jackshaft pulley, a support on said baler for said lineshaft tube for keeping said belt taut said bale thrower pivots, as said support comprising a pair of leaf springs, one end of each of said springs being attached to said baler, the other end of each of said springs being attached to said lineshaft tube, a variable diameter pulley on said lineshaft adjacent the other end thereof, a main power supply shaft for said baler, a pulley on said main power supply shaft, an endless main power transmission belt engaging said power supply shaft pulley and said variable diameter pulley, an arm pivotally mounted on said baler, an idler pulley rotatably mounted on said arm and engaging said last-named belt, a crank mechanism on said baler, said crank mechanism comprising a U-shaped standard mounted on said baler, a J-shaped cord barrel journalled in said standard, at least one locking hole in said standard, a spring on said cord barrel biasing the crook of said J-shaped cord barrel towards said locking hole and thereinto, a telescoping crank arm joined to the crook of said J-shaped cord barrel, and means connecting said idler pulley arm and said cord barrel and operable thereby to move said idler pulley towards or away from said last-named belt to control the pressure with which said idler pulley engages said belt.

3. For a bale thrower pivotally mounted on a baler at the bale discharge thereof and driven by a belt-type mule drive having a drive belt that tends to become slack when said bale thrower pivots to either side of said baler, said baler having a power supply, a lineshaft assembly for a power takeoff from said baler power supply to said mule drive, said lineshaft assembly comprising: a lineshaft, bearing means rotatably supporting said lineshaft, and resilient means for maintaining said belt-type mule drive taut, said resilient means supporting said bearing means, said resilient means comprising a member joined at its one end to said bearing means and having means at its other end for connection to said baler.

4. A lineshaft assembly as recited in claim 3, wherein: said resilient member comprises a pair of leaf springs, one end of each of said leaf springs includes means for connection thereof to said baler, and the other end of each of said leaf springs supports said bearing means.

5. A line shaft assembly as recited in claim 4, wherein: said bearing means comprises a tube and a plurality of bearings supported in said tube, said lineshaft being journaled in said bearings, each leaf spring being attached at its other end to said tube.

References Cited by the Examiner
UNITED STATES PATENTS

| | | | |
|---|---|---|---|
| 1,390,464 | 9/1921 | Senstius | 308—15 |
| 2,293,313 | 8/1942 | Sladky | 308—22 |
| 2,337,290 | 12/1943 | Yost | 308—15 |
| 2,824,457 | 2/1958 | Norton. | |
| 3,095,962 | 7/1963 | Hollyday | 198—128 |
| 3,110,392 | 11/1963 | Hollyday | 198—128 |
| 3,124,235 | 3/1964 | Hollyday | 198—128 |
| 3,235,061 | 2/1966 | Craig | 198—128 |

EVON C. BLUNK, *Primary Examiner.*

RICHARD E. AEGERTER, *Examiner.*